United States Patent
Hong et al.

(10) Patent No.: US 7,962,796 B2
(45) Date of Patent: Jun. 14, 2011

(54) STATE TESTING DEVICE AND METHODS THEREOF

(75) Inventors: Leon Hong, Austin, TX (US); James T. Lee, Jr., Buda, TX (US)

(73) Assignee: Globalfoundries Inc.

( * ) Notice: Subject to any disclaimer, the term of this patent is extended or adjusted under 35 U.S.C. 154(b) by 547 days.

(21) Appl. No.: 11/941,311

(22) Filed: Nov. 16, 2007

(65) Prior Publication Data

US 2009/0132222 A1    May 21, 2009

(51) Int. Cl.
*G06F 11/00* (2006.01)
(52) U.S. Cl. .............. 714/37; 714/25; 714/40
(58) Field of Classification Search .............. 714/37
See application file for complete search history.

(56) References Cited

U.S. PATENT DOCUMENTS

| | | | |
|---|---|---|---|
| 7,509,533 B1 * | 3/2009 | Govindarajalu | 714/30 |
| 2007/0038898 A1 * | 2/2007 | Clee et al. | 714/38 |

OTHER PUBLICATIONS

F. Abel, "Design and Verification Methodology of Modern High-Speed Switches," SAME 2000, Oct. 25, 2000, pp. 1-9.

* cited by examiner

*Primary Examiner* — Scott T Baderman
*Assistant Examiner* — Sarai Butler

(57) ABSTRACT

A test method for a data processing device includes determining both a current state of the device and a desired state of the device. A set of instructions to transition the data processing device from the current state to the target state is obtained by initially selecting a first source state from a set of possible source states and corresponding instructions that can transition the device to the desired state. The instruction associated with the first source state is placed on an instruction stack. The source state and instruction selection process is repeated until the selected source state corresponds to the current state of the device under test. The instructions in the stack are applied to the device under test, and the resulting device state compared to the specified state to determine a test result.

17 Claims, 5 Drawing Sheets

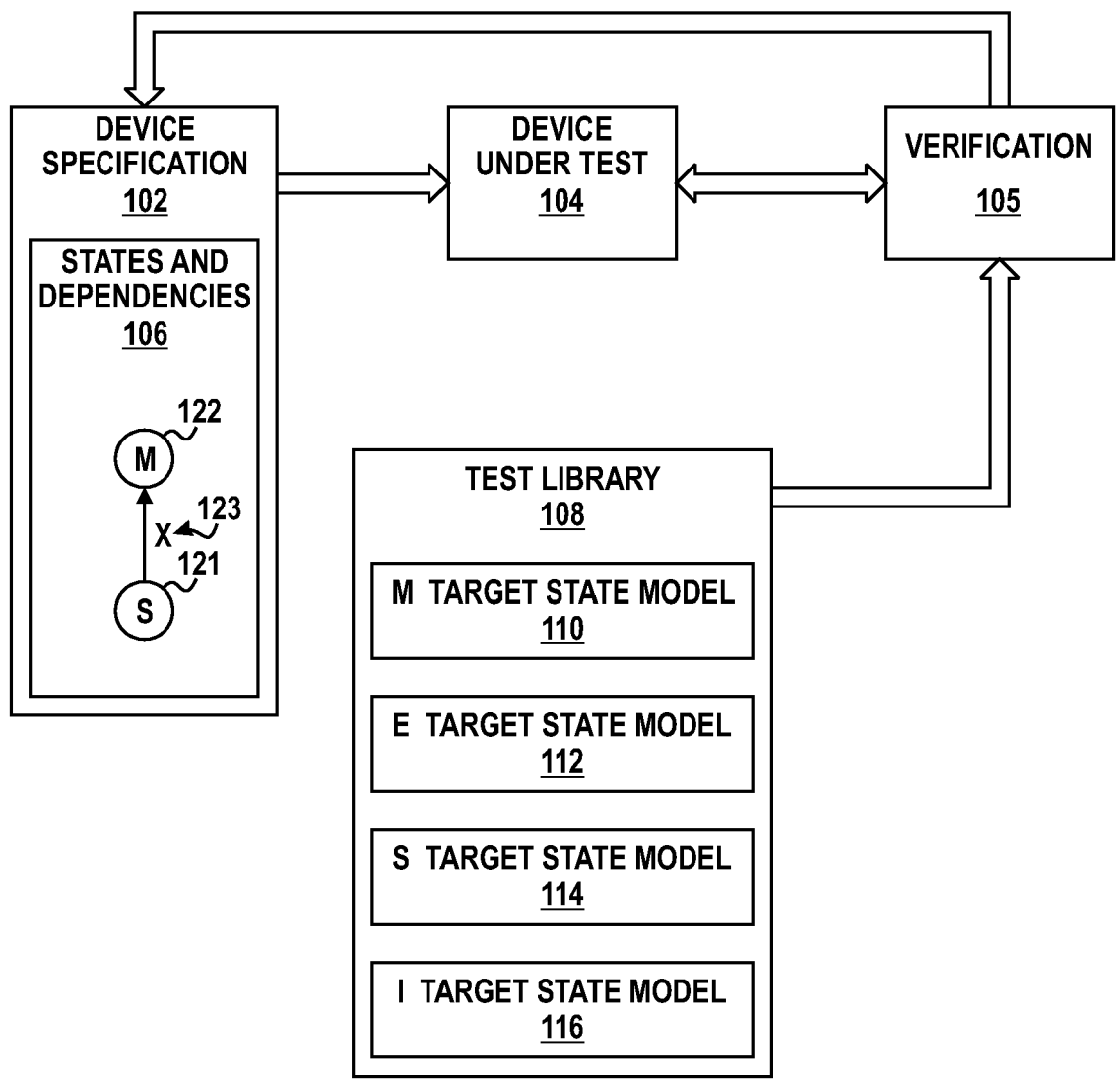
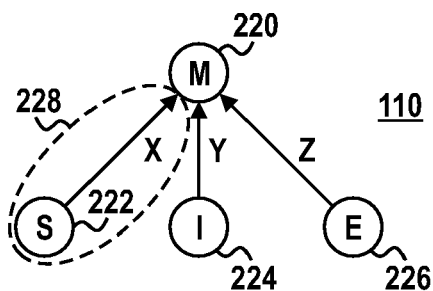
FIG. 2
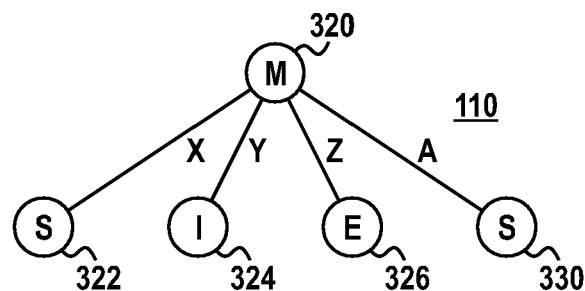
FIG. 3

STATE TESTING DEVICE AND METHODS THEREOF

FIELD OF THE DISCLOSURE

The present disclosure relates to data processing devices and more particularly to testing of data processing devices.

BACKGROUND

A data processing device, such as a physical device or a behavioral model of a physical device, is typically tested to determine whether the device complies with a specification. One testing methodology includes placing the data processing device in a randomly determined initial state, applying a random set of stimuli to the data processing device, and comparing the resultant state to an expected state. By repeating this process with different initial states or applying different stimuli to the device, the relationship between different possible states and stimuli are tested. However, this procedure does not guarantee that the data processing device complies with the specification for cases of specific initial states and specific stimuli. Such cases can be tested by creating specific test procedures for each case, but this can be inefficient, especially for complex data processing devices. Accordingly, an improved data processing test device and methods would be useful.

BRIEF DESCRIPTION OF THE DRAWINGS

FIG. 1 is a block diagram of a test process for a data processing device according to one embodiment of the present disclosure;

FIG. 2 is a diagram of a particular embodiment of a target state model of the test process of FIG. 1;

FIG. 3 is a diagram of another particular embodiment of a target state model of the test process of FIG. 1;

DETAILED DESCRIPTION

Figure 4:
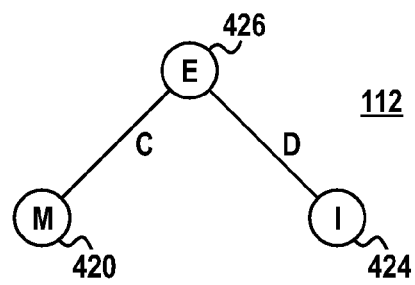
FIG. 4 is a diagram of an alternative particular embodiment of a target state model of the test process of FIG. 1.

A test method for a data processing device includes determining both a current state of the device and a desired state of the device. A set of instructions to transition the data processing device from the current state to the target state is determined by working backwards from the target state to the current state. For example, a first source state is selected from a set of possible source states and corresponding instructions that can transition the device from the first source state to the desired state. The set of instructions associated with the first source state is placed on an instruction stack. If the first source state does not match the current state of the device, a second source state is selected from a set of possible source states and corresponding set of instructions that can transition the device from the second source state to the first source state is placed on the instruction stack. The source state and instruction selection process is repeated until the selected source state corresponds to the current state of the device under test. The instructions in the stack are applied to the device under test, and the resulting device state compared to the desired state to determine a test result. Thus, the instructions used to transition from an initial state to a desired state are determined based on a known set of states and instructions, thereby reducing the need to design special test procedures to achieve the specified target state at the device under test.

Referring to FIG. 1, a block diagram of a test process 100 for a data processing device is illustrated. The test process 100 includes a device specification 102, a device under test 104, a verification process 105, and a test library 108.

For purposes of discussion, it is assumed that the device under test 104 is a cache portion of a data processing device, and that the cache portion conforms to the MESI protocol. Accordingly, a cache line represented by the device under test 104 can be in one of a number of states, including a modified ("M") state, an exclusive ("E") state, a shared ("S") state, or an invalid ("I") state. Further, although it is assumed that the device under test 104 is a cache line for purposes of discussing the exemplary embodiment of FIGS. 1-8, it will be appreciated that in other embodiments the device under test 104 can be any data processing device, such as a general purpose microprocessor, an application specific integrated circuit (ASIC), or other data processing device, or any portion of a data processing device.

The device specification 102 specifies requirements for a data processing device, including material requirements, such as physical, mechanical, and electrical requirements, environmental requirements such as temperature and pressure tolerances, safety and quality requirements, and the like. In addition, the device specification 102 includes behavioral requirements to define the operational behavior of the data processing device. In the exemplary embodiment of FIG. 1, the device specification 102 defines the requirements and operational behavior of a cache line. It will be appreciated that although for purposes of discussion the device specification 102 is illustrated as a single item, in other embodiments the information in the device specification 102 can be located in multiple documents or files. For example, in an embodiment the states and dependencies 106 can be located separately from other information in the device specification 102.

The states and dependencies 106 reflect the portions of the device specification 102 that define the behavior of the data processing device for specific states and stimuli. As used herein, the term "state" refers to a configuration of information at a data processing device. Each state can have one or more dependencies. As used herein a "dependency" of a particular state refers to a source states and set of instructions that result in a particular target state being achieved. Further, the term "instruction" as used herein refers to any stimuli at a data processing device that can be used to facilitate the device transitioning from a source state to another state.

In the example of FIG. 1, the design specification includes information identifying states and dependencies 106 that define the behavior of a coherency protocol of the cache line. In particular, the states and dependencies 106 define an initial coherency state 121 of the cache line after reset. In the illustrated example, the initial coherency state 121 corresponds to a shared state. The states and dependencies 106 further indicate that, in response to an instruction 123, labeled "X", the cache line should transition from the shared state 121 to a modified state 122. Accordingly, the dependencies of the modified state 122 include a source state representing the shared state 121 and the instruction 123 that causes the transition between the shared state 121 and the modified state 122.

The states and dependencies 106 are used to define the device under test 104, which can be a physical device or a model of a physical device, such as a behavioral model. Further, the device under test 104 can represent a portion of the device specified by the device specification 102. This allows a data processing device to be developed in a modular fashion, improving the efficiency of the design process. In the example of FIG. 1, the device under test 104 represents a cache line, and therefore can be a behavioral model of a cache line or can be a cache line at a physical device under test.

The test library 108 is developed based on the device specification 102 and other information to include information used by a verification process 105 to test the device under test 104. Accordingly, while the device specification includes requirements for the device under test 104, the test library 108 includes test procedures, tools, and other information that can be used by the verification process 105 to determine whether the device under test 104 complies with the device specification 102. Specifically, the test library includes a number of target state models, such as target state models 110, 112, 114, and 116 (models 110-116) that are based on the states and dependencies 106, and represent the behavior of portions of the device under test 104 based on particular target states. In the example of FIG. 1, each of the target state models 110-116 represent a respective target states for the "MESI" coherency protocol for a cache line of the device under test 104 together with one or more source states and corresponding sets of instructions, as will be better understood with reference to FIGS. 2-6.

FIG. 2 is a diagram of a particular embodiment of the modified ("M") target state model 110. As illustrated in FIG. 2, the target state module 110 includes a target state 220, representing that a cache line is in a modified state. The target state module 110 also includes a number of dependencies, such as dependency 228. Each dependency includes a source state and an associated set of instructions that will cause a transition from the source state to the target state. Thus, the dependency 228 includes the source state 222, representing the cache line in a shared state and an instruction set, labeled "X", that causes the cache line to transition from the shared state to the state 220. Thus, the dependency 228 indicates that, if the cache line is in the shared state 222 and the instruction set X is applied to the device under test 104, the cache line will be placed in the modified state 220.

In the illustrated example of FIG. 2, the target state model 110 includes additional source states and associated instructions, including an invalid state 224 and associated instruction set labeled "Y", and an exclusive state 226 and an associated instruction set labeled "Z." Collectively, the source states 222, 224, and 226 and the associated instructions represent the possible source states and instructions, as indicated by the states and dependencies 106 (FIG. 1) that will cause the device under test to be placed in the target state 220.

As illustrated in FIG. 2, each dependency for the target state 220 includes a source state and a unique instruction set that causes the transition to the target state. Accordingly, if multiple instruction sets can result in transition from a source state to a target state, each instruction is set forth in a separate dependency. This is illustrated in FIG. 3. FIG. 3 shows an alternative embodiment of the target state model 110, and includes the target state 320 and source states 322, 324, and 326, corresponding to the target state 220 and source states 222, 224, and 226 respectively. The target state model 110 also includes a source state 330, representing a shared state of the cache line, and an associated instruction set labeled "A" that causes the cache line to transition to the target state 320. Accordingly, in the illustrated example of FIG. 3, if the cache line is in the shared state, as represented by the source states 322 and 330, transition to the target state 320 can be caused by either the X instruction set or the A instruction set.

Referring to FIG. 4, a particular embodiment of the target state model 112 is illustrated. The target state model 112 includes a target state 426, representing the cache line is in an exclusive state. The target state model 112 also includes a source state 420, representing the cache line in a modified state, and an associated instruction set labeled "C" that causes the cache line to transition to the target state 426. The target state model 112 further includes a source state 424, representing the cache line in an invalid state, and an associated instruction set labeled "D" that causes the cache line to transition to the target state 426.

Figure 5:
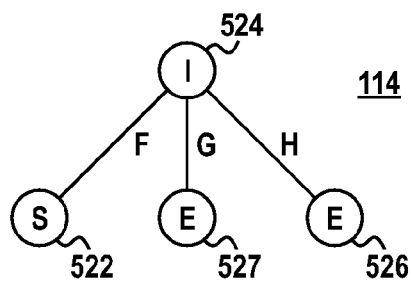
FIG. 5 is a diagram of another particular embodiment of a target state model of the test process of FIG. 1.

Referring to FIG. 5, a particular embodiment of the target state model 114 is illustrated. The target state model 114 includes a target state 524, representing the cache line is in an invalid state. The target state model 114 also includes a source state 522, representing the cache line in a shared state, and an associated instruction labeled "F" that causes the cache line to transition to the target state 524. The target state model 114 further includes a source state 527 and a source state 526, each representing the cache line in an exclusive state, and associated instructions labeled "G" and "H", respectively, that cause the cache line to transition to the target state 426.

Figure 6:
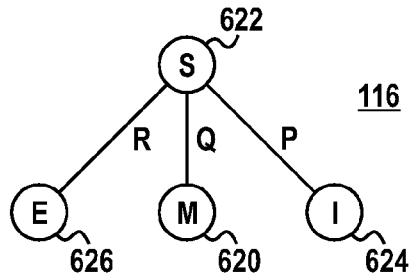
FIG. 6 is a diagram of another particular embodiment of a target state model of the test process of FIG. 1.

Referring to FIG. 6, a particular embodiment of the target state model 116 is illustrated. The target state model 116 includes a target state 622, representing that the cache line is in a shared state. The target state model 112 also includes a source state 626, representing the cache line in an exclusive state, and an associated instruction set labeled "R" that causes the cache line to transition to the target state 622. The target state model 116 further includes a source state 620, representing the cache line in a modified state, and an associated instruction labeled "Q" that causes the cache line to transition to the target state 622. In addition, the target state model includes a source state 624, representing the cache line in an invalid state, and an associated instruction set labeled "P" that causes the cache line to transition to the target state 622.

Referring again to FIG. 1, the verification process 105 uses the target state models 110-116 to verify compliance of the device under test 104 with the device specification 102. In particular, the verification process 105 can apply a particular set of instructions at the device under test 104 result in the device so that the device transitions from a specified initial state to a final test state. This test state is compared to a specified final state set forth in the device specification 102 to determine whether the device under test 104 is performing as specified.

The target state models 110-116 can be used to develop the set of instructions applied to the device under test 104. To illustrate, an initial state and a final state can be specified to the verification process 105, which accesses the target state model associated with the specified final state. The verification process 105 uses the accessed target state model to select one of the source states associated with the final state, and stores the instruction set associated with the selected source state in an instruction stack. If the specified initial state has not been reached, the verification process 105 accesses the target state model for the state associated with the selected source state and selects a source state from that target state model. The instruction set associated with the selected source state is pushed onto the stack. The verification process 105 continues to select source states and place associated instruction sets on the instruction stack until the source state corresponds to the specified initial state. The resulting instruction stack represents the instructions that can be used to test the transition of the device under test 104 from the specified initial state to the specified final state.

Figure 7:
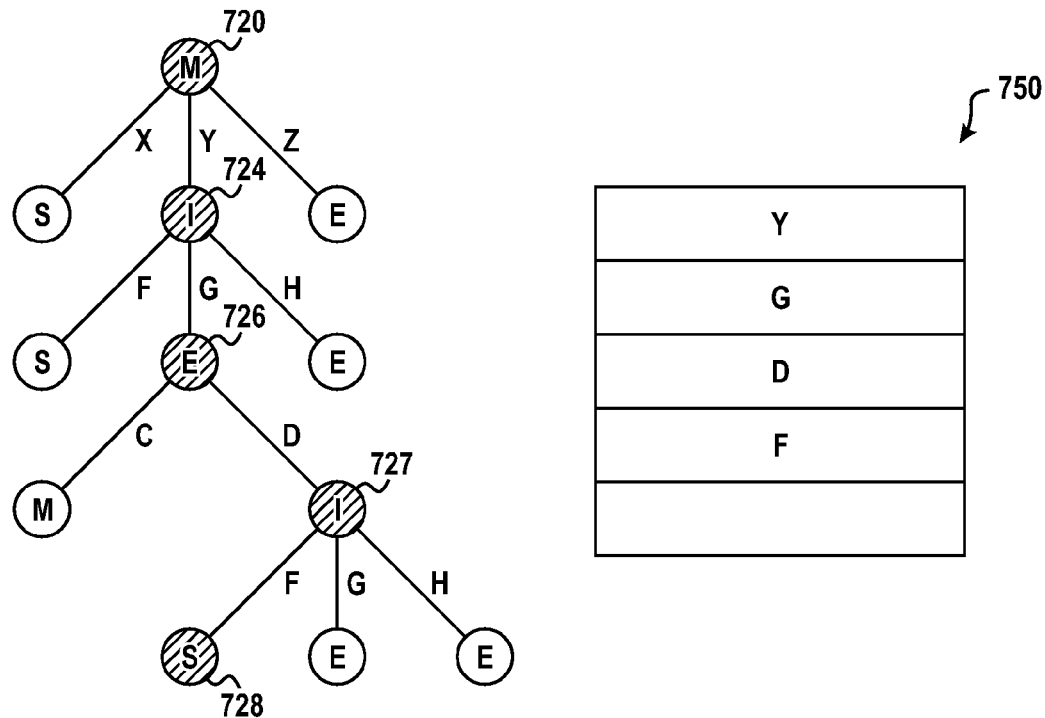
FIG. 7 is a diagram of an exemplary test in accordance with one embodiment of the present disclosure.

This process can be better understood with reference to the example of FIG. 7. FIG. 7 illustrates a particular embodiment of an instruction development process for the device under test 104 by the verification process 105. In the illustrated example, the specified initial state is the shared state 728 and the specified final state is the modified state 720. Accordingly, the verification process 105 accesses the target state model 110 and selects one of the source states indicated by the model. In this example, the verification process 105 selects the source state 724. The verification process 105 further determines that the instruction associated with the source state 724 is the Y instruction set, and accordingly stores the Y instruction set in an instruction stack 750.

The verification process 105 compares the source state 724 to the specified initial state, and determines that they are different. In response, the verification process 105 accesses the target state model for the source state. In this case, the source state 724 represents an invalid state, so the verification process 105 accesses the target state model 116, and selects the source state 726 from the set of source states. The associated instruction set G is pushed on the stack 750.

The verification process 105 determines that the source state 726 does not match the specified initial state 728, and again accesses one of the target state models at the test library 108. In this case, the source state 726 is an exclusive state, so the verification process 105 accesses the target state model 112. The verification process 105 selects the source state 727 from the set of possible source states and pushes the associated D instruction set on the instruction stack 750. Because the source state 727 does not match the specified initial state 728, the verification process 105 accesses the target state model 114, which corresponds to the source state 727. The verification process selects the source state 728 from the set of possible source states indicated by the target state model 115 and pushes the associated F instruction set onto the stack 750. Further, the verification process 105 determines that the source state 728 corresponds to the specified initial state, and therefore stops the instruction development process.

Referring again to FIG. 1, after developing the set of instructions and placing them on the instruction stack 750, the verification process 105 can test the device under test 104. To illustrate, the verification process 105 places the device under test 104 in the specified initial state and applies the instructions in the instruction stack 750 to the device, reversing the order in which the instructions were placed on the stack. After applying the instructions, the verification process 105 compares the state of the device under test 104 to the specified final state. In the event that the states do not match, the verification process 105 can report an error indicating that there is a mismatch between the device under test 104 and the device specification 102. In response, a designer can modify either the device specification 102 or the device under test 104.

In addition, the verification process 105 can modify the instruction development process according to specified testing parameters. For example, in one embodiment, the verification process 105 can select source states from the target state models 110-116 in a random fashion. As used herein, the term "random" includes any random or pseudo-random process. In another embodiment, each source state of a target state model can be given a weight, and the source state determined based on these weights. In a particular embodiment, the weights are programmable values. In addition, the verification process 105 can apply constraints on which source states can be selected. For example, in an embodiment the verification process 105 ensures that selected source states are not repeated as the instructions are developed. Accordingly, the instruction development process can be flexibly implemented to comply with a particular verification process.

Figure 8:
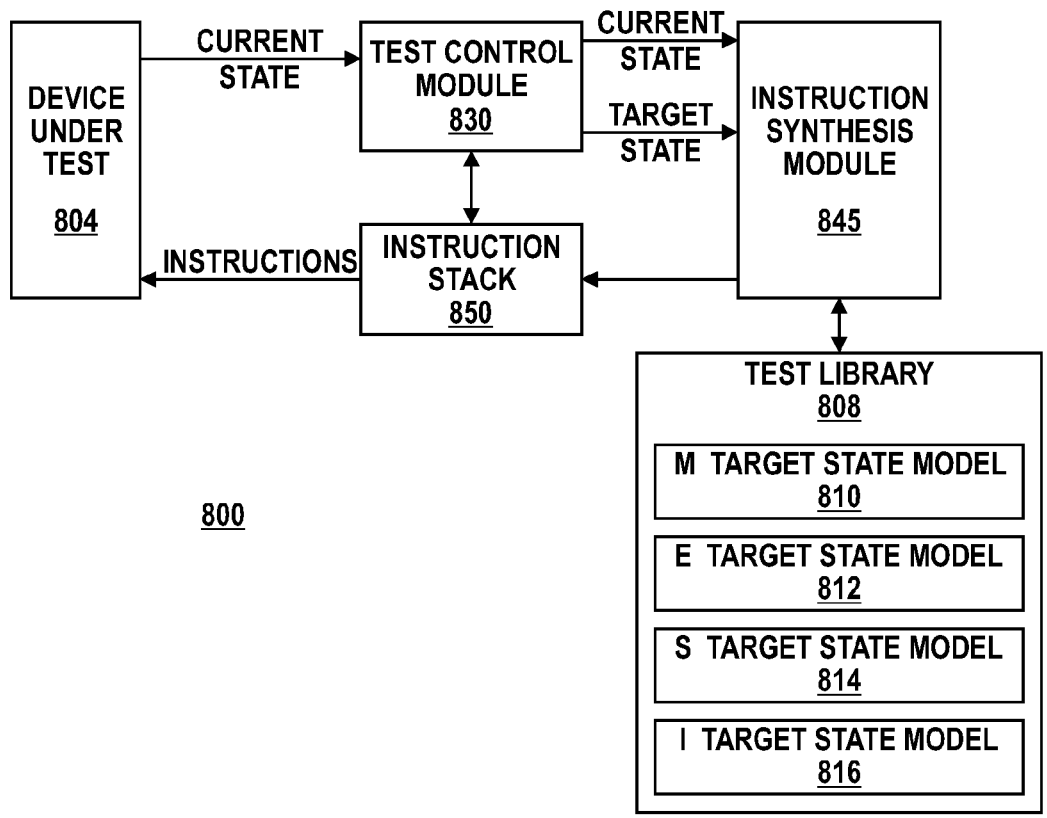
FIG. 8 is a block diagram of a test system in accordance with one embodiment of the present disclosure.

Referring to FIG. 8, a block diagram of a test system 800 for implementing the verification process 105. The test system 800 includes a device under test 804, corresponding to the device under test 14 of FIG. 1, and a test library 808, corresponding to the test library 108 of FIG. 1. The test library 808 includes target state models 810, 812, 814, and 816 (target state models 810-816), corresponding to the target state models 110-116 of FIG. 1. The test system 800 also includes a test control module 830, an instruction synthesis model 845, and an instruction stack 850.

In operation the test control module 830 receives the current state of the device under test 804 and determines a desired target state. The desired target state can be programmed by a user, determined in a pseudo-random fashion, and the like. The test control module 830 provides the current state and the target state to the instruction synthesis module 845, which accesses the target state models 810-816 to develop instructions in a similar fashion as described above with respect to FIGS. 1-7. The instruction synthesis module 845 stores the developed instructions at the instruction stack 850.

Once the instructions have been developed, the test control module 830 applies the instructions at the instruction stack 850 to the device under test 804. After the instructions have been applied, the test control module 830 compares the current state of the device under test 804 to the specified final state to determine a test result. For example, based on the comparison, the test control module can store a test result indicating the test was passed or failed. Further, after executing a series of tests, the stored test results can be provided to a designer for analysis.

Figure 9:
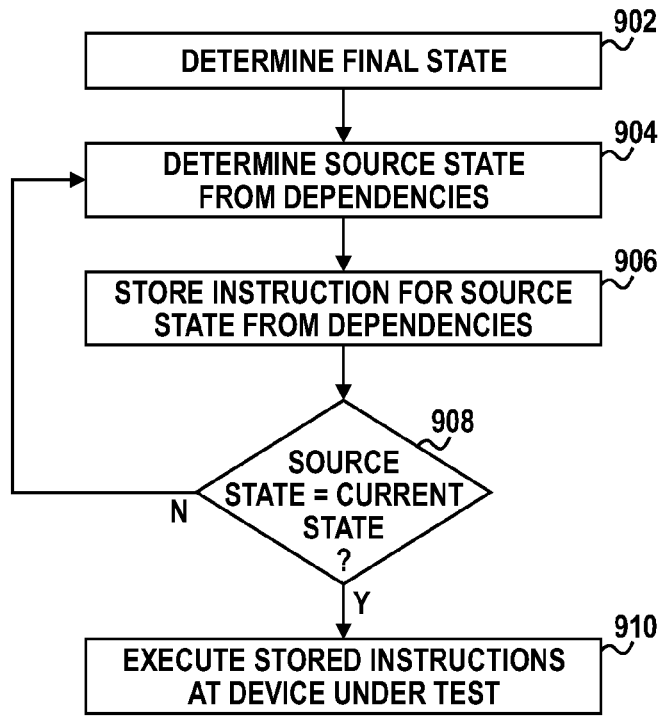
FIG. 9 is a flow diagram of a method of testing a data processing device in accordance with one embodiment of the present disclosure.

Referring to FIG. 9, a flow diagram of a particular embodiment of a method of testing a data processing device is illustrated. At block 902, a specified final state for the device under test is determined. The specified end state can be user-programmable, determined randomly, and the like. At block 904, a list of dependencies for the specified end state is accessed to determine a source state associated with the end state. At block 906, the instruction set associated with the selected source state is stored at an instruction stack.

Proceeding to block 908, it is determined whether the source state is equivalent to the current state of the device under test. If not, the method flow returns to block 904 and another source state is determined from the set of dependencies associated with the previously selected source state. If, at block 908, it is determined that the source state is equivalent to the current state of the device under test, the method flow moves to block 910 and the instructions stored at the instruction stack are executed at the device under test. After execution of the stored instructions, the state of the device under test can be compared to the specified final state to determine a test result.

Figure 10:
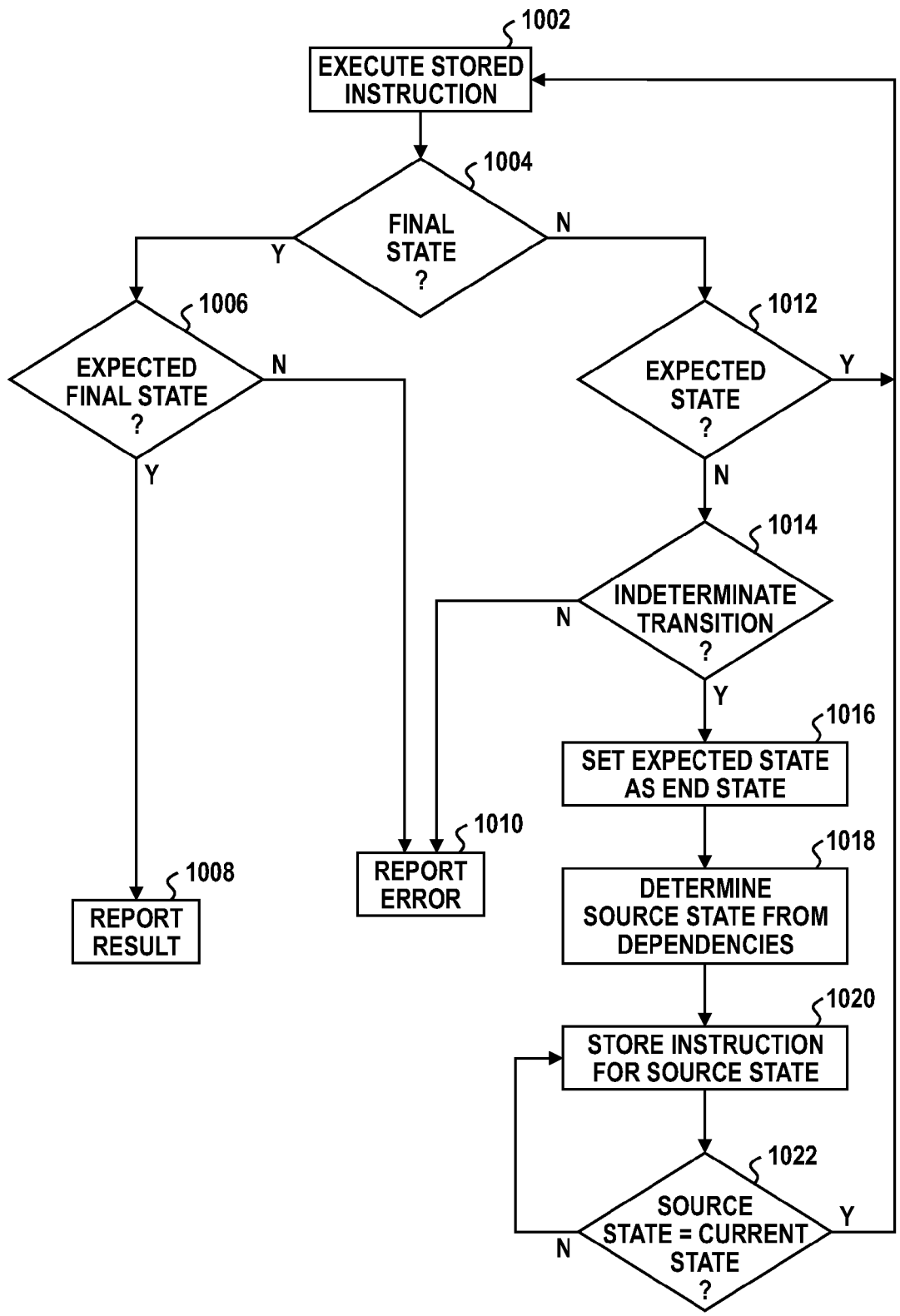
FIG. 10 is a flow diagram of a method of testing a data processing device in accordance with another embodiment of the present disclosure.

For some device states, transition between states resulting from executed instructions can be indeterminate. That is, a particular instruction set can cause a device under test to transition to one of a number of possible states. Accordingly, at block 910, execution of instructions at the device under test can cause the device to enter an unexpected, but valid, state. In this case, additional instructions can be developed that, when executed, will place the device under test in the expected state. This can be better understood with reference to FIG. 10, which illustrates flow diagram of a particular embodiment of a method of executing instructions at a device under test.

At block 1002, an instruction is executed at the device under test. At block 1004, it is determined whether the state of the device under test is a final state (e.g. whether all instructions for the test have been executed). If so, the method flow moves to block 1006 and it is determined whether the final state of the device under test corresponds to a specified final state. If so, the method flow moves to block 1008 and a test result is reported. If the final state of the device under test does not match the specified final state, the method flow moves to block 1010 and an error is reported.

Returning to block 1004, if the state of the device under test does not correspond to a final state (e.g. there remain instructions on the stack to be executed), the method flow moves to block 1012 and it is determined whether the state of the device under test matches an expected state. If so, the method flow returns to block 1002 to execute the next instruction on the stack. If the state of the device under test does not match the expected state, the method flow moves to block 1014 and it is determined whether the state of the device under test was the result of an indeterminate transition. This determination can be made based on the instruction that was executed at block 1002 to place the device under test in its current state. For example, the instruction stack can store information for each instruction indicating whether the instruction can cause an indeterminate transition at the device under test. Alternatively, the determination can be made by accessing a target state model for the current state of the device under test, and determining whether the target state model includes the previous state of the device under test.

If, at block 1014, it is determined that the current state of the device under test is not the result of an indeterminate transition, the method flow moves to block 1010 and an error is reported to indicate that the device under test has been placed in an unexpected state by the instructions on the instruction stack. If, at block 1014, it is determined that the current state of the device under test is the result of an indeterminate transition, the method flow moves to block 1016 and the expected state is set as an end state. The method flow moves to block 1018 and a source state is selected based on the dependencies associated with the end state. At block 1020 the instruction associated with the selected source state is pushed onto the instruction stack. At block 1022 it is determined whether the source state corresponds to the current state of the device under test. If not, the method flow returns to block 1018 to determine another source state based on the dependencies associated with the selected source state. If, at block 1022, it is determined that the selected source state corresponds to the current state, then sufficient instructions to place the device under test in the end state have been stored on the stack. Accordingly, the method flow returns to block 1002 to continue execution of instructions at the stack.

It should be understood that the specific steps indicated in the methods herein, and/or the functions of specific modules herein, may be implemented in hardware and/or software. For example, a specific step or function may be performed using software and/or firmware executed on one or more a processing modules. In general, a system for testing a data processing device may include a generic processing module and memory. The processing module can be a single processing device or a plurality of processing devices. Such a processing device may be a microprocessor, microcontroller, digital processor, microcomputer, a portion of a central processing unit, a state machine, logic circuitry, and/or any device that manipulates the signal.

The manipulation of these signals is generally based upon operational instructions represented in a memory. The memory may be a single memory device or a plurality of memory devices. Such a memory device may be a read only memory, a random access memory, a floppy disk memory, magnetic tape memory, erasable memory, a portion of a system memory, and/or any device that stores operational instructions in a digital format. Note that when the processing module implements one or more of its functions, it may do so where the memory storing in the corresponding operational instructions is embedded within the circuitry comprising a state machine and/or other logic circuitry.

Figure 11:
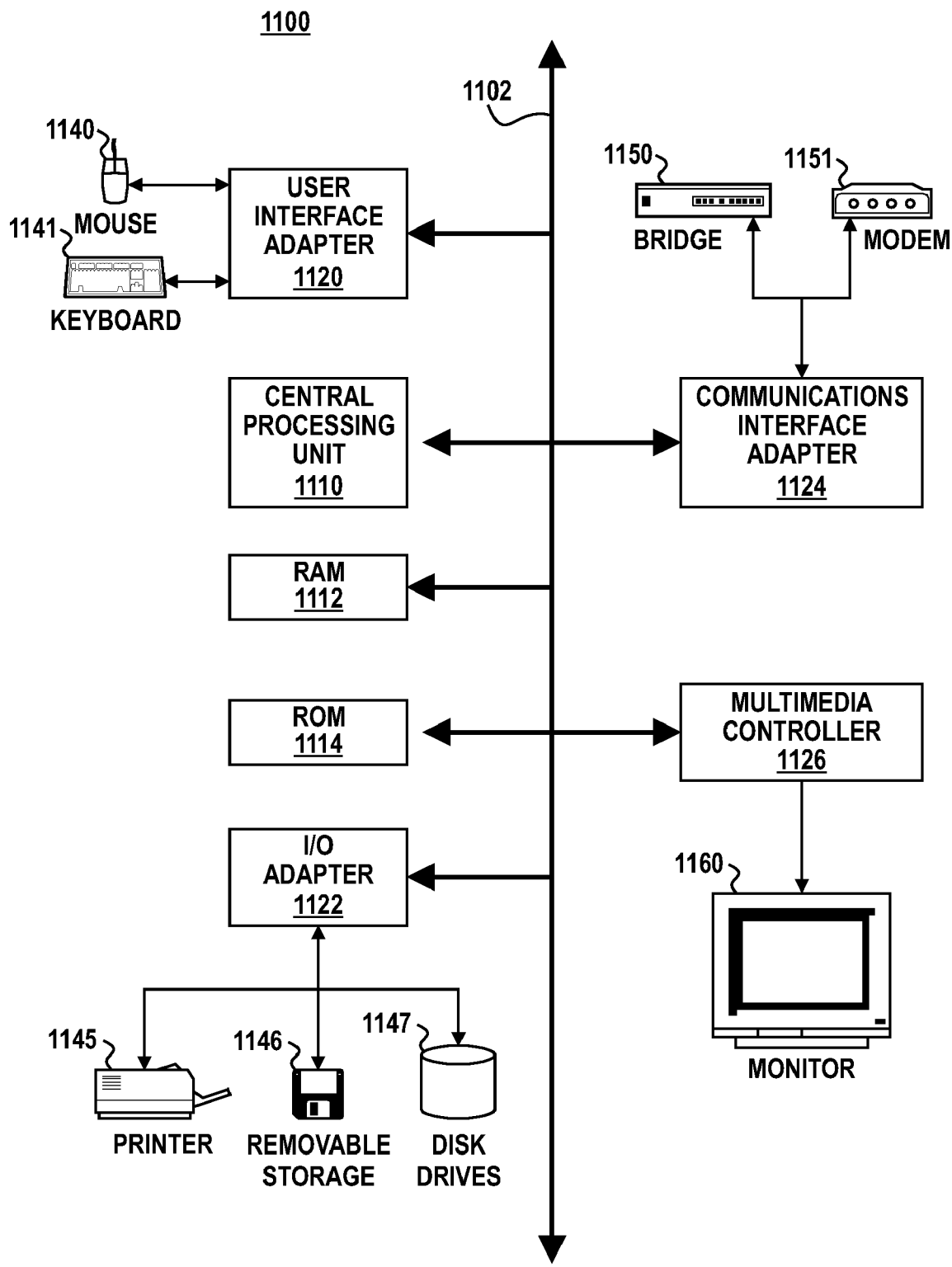
FIG. 11 is a block diagram of a computer device in accordance with one embodiment of the present disclosure.

FIG. 11 illustrates, in block diagram form, a processing device in the form of a computer system 1100. The computer system 1100 is illustrated to include a central processing unit 1110, which may be a conventional proprietary data processor, memory including random access memory 1112, read only memory 1114, and input output adapter 1122, a user interface adapter 1120, a communications interface adapter 1124, and a multimedia controller 1126. The input output (I/O) adapter 1126 is further connected to, and controls, disk drives 1147, printer 1145, removable storage devices 1146, as well as other standard and proprietary I/O devices. The user interface adapter 1120 can be considered to be a specialized I/O adapter. The adapter 620 is illustrated to be connected to a mouse 1140, and a keyboard 1141. In addition, the user interface adapter 1120 may be connected to other devices capable of providing various types of user control, such as touch screen devices.

The communications interface adapter 1124 is connected to a bridge 1150 such as is associated with a local or a wide area network, and a modem 1151. By connecting the system bus 1102 to various communication devices, external access to information can be obtained. The multimedia controller 1126 will generally include a video graphics controller capable of displaying images upon the monitor 1160, as well as providing audio to external components (not illustrated). Generally, the system 600 will be capable of implementing the system and methods described herein.

Other embodiments, uses, and advantages of the disclosure will be apparent to those skilled in the art from consideration of the specification and practice of the disclosure disclosed herein. It will further be appreciated that, although some circuit elements and modules are depicted and described as connected to other circuit elements, the illustrated elements may also be coupled via additional circuit elements, such as resistors, capacitors, transistors, and the like. The specification and drawings should be considered exemplary only, and the scope of the disclosure is accordingly intended to be limited only by the following claims and equivalents thereof.

What is claimed is:

1. A method comprising: a) identifying a desired state of a device under test as a target state; b) selecting, based on the target state, a source state from a target state model associated with the target state, the target state model including a plurality of source states, each of the plurality of source states associated with a corresponding set of instructions; c) storing a set of instructions associated with the source state in an instruction stack, the set of instructions to transition the device under test from the corresponding source state to the target state; and d) in response to determining that the source state does not match a current state of the device under test, setting the source state as the target state and repeating a), b), and c).

2. The method of claim 1, further comprising:
e) repeating d) until the source state matches the current state of the device under test.

3. The method of claim 2, further comprising:
f) executing instructions in the instruction stack at the device under test;
g) in response to determining that a state of the device under test does not match an expected state:
   h) in response to determining that the state of the device under test did not result from an indeterminate transition between states, reporting an error; and
   i) in response to determining that the state of the device under test did result from an indeterminate transition between states, setting the expected state as the target state and repeating b), c), d), and e) until the state of the device under test matches the expected state.

4. The method of claim 3, further comprising:
j) determining if the state of the device under test resulted from an indeterminate transition based on data stored at the instruction stack.

5. The method of claim 3, further comprising:
j) determining if the state of the device under test resulted from an indeterminate transition based on whether the source state is included in a target state model associated with the state of the device under test.

6. The method of claim 1, wherein selecting the source state comprises randomly selecting the source state from the plurality of source states.

7. The method of claim 1, wherein selecting the source state comprises:
determining a set of weights associated with the plurality of source states; and
selecting the source state based on the set of weights.

8. The method of claim 7, wherein the set of weights are programmable.

9. The method of claim 1, wherein the device under test is a behavioral model of a device.

10. A method comprising: setting a desired state of a device under test as a target state; selecting, based on the target state, a first source state from a first target state model associated with the target state, the first target state model including a first plurality of source states; storing a first set of instructions associated with the first source state in an instruction stack, the first set of instructions to transition the device under test from the source state to the target state; determining a current state of the device under test; in response to determining the first source state does not match the current state, selecting a second source state from a second target state model associated with the second state, the second target state model including a second plurality of source states; and storing a second set of instructions associated with the third state in the instruction stack, the second set of instructions to transition the device under test from the second source state to the first source state.

11. The method of claim 10, further comprising:
executing instructions stored at the instruction stack at the device under test; and
reporting an error in response to determining that, after executing the instructions stored at the stack, a state of the device does not correspond to the desired state.

12. The method of claim 10, wherein selecting the first source state comprises randomly selecting the first source state from the first plurality of source states.

13. A computer readable medium comprising a computer program
including instructions to manipulate a processor, the instructions comprising instructions to: a) set a desired state of a device under test as a target state; b) select, based on the target state, a source state from a target state model associated with the target state, the target state model including a plurality of source states; c) store the set of instructions associated with the source state in an instruction stack, the set of instructions to transition the device under test from the source state to the target state; and d) in response to determining that the source state does not match a current state of the device under test, set the source state as the target state and repeating b), and c).

14. The computer readable medium of claim 13, the instructions further comprising instructions to: e) repeat d) until the source state matches the current state of the device under test.

15. The method of claim 13, wherein the instructions to select the source state comprise instructions to randomly select the source state from the plurality of source states.

16. The method of claim 13, wherein the instructions to select the source state comprise instructions to:
determine a set of weights associated with the plurality of source states; and
select the source state based on the set of weights.

17. The method of claim 13, wherein the device under test is a behavioral model of a device.

* * * * *